United States Patent [19]

Rodgers

[11] Patent Number: 6,019,114
[45] Date of Patent: Feb. 1, 2000

[54] SELF-METERING RESERVOIR

[75] Inventor: Donald B. Rodgers, Saugerties, N.Y.

[73] Assignee: Icon Dynaamics, LLC, Rhinebeck, N.Y.

[21] Appl. No.: 08/799,746

[22] Filed: Feb. 12, 1997

[51] Int. Cl.[7] .......................... F16K 31/22; F16K 49/00
[52] U.S. Cl. ................... 137/2; 137/8; 137/209; 137/210; 137/341; 137/386; 137/404; 137/406; 137/433; 141/4; 141/66; 141/198; 222/67; 251/65
[58] Field of Search ........................ 137/341, 386, 137/392, 403, 404, 430, 433, 209, 210, 406, 2, 8, 391; 141/83, 95, 198, 65, 66, 82, 4, 5, 6, 7, 8; 222/64, 67, 54, 55, 57, 58; 251/65; 261/121.1, 125

[56] References Cited

U.S. PATENT DOCUMENTS

| | | | |
|---|---|---|---|
| 347,559 | 8/1886 | Blessing | 137/404 |
| 699,249 | 5/1902 | Sharples | 137/404 |
| 1,155,327 | 9/1915 | Lee | 137/404 |
| 2,691,386 | 10/1954 | Madison | 137/433 |
| 3,044,482 | 7/1962 | Golden | 137/433 |
| 3,467,135 | 9/1969 | Muskalla | 137/433 |
| 4,203,463 | 5/1980 | Ponlot et al. | 137/433 |
| 4,235,829 | 11/1980 | Partus | 137/386 |
| 4,313,897 | 2/1982 | Garrard | 137/404 |
| 4,580,592 | 4/1986 | Clark et al. | 137/404 |
| 4,582,480 | 4/1986 | Lynch et al. | 261/125 |
| 4,859,375 | 8/1989 | Lipisko et al. | 137/209 |
| 4,979,545 | 12/1990 | Fair | 137/386 |
| 4,979,643 | 12/1990 | Lipisko et al. | 232/83 |
| 5,038,840 | 8/1991 | Fair | 137/386 |
| 5,176,167 | 1/1993 | Tiao | 251/65 |
| 5,279,338 | 1/1994 | Goossens | 141/95 |
| 5,440,887 | 8/1995 | Nishizato et al. | 137/341 |

FOREIGN PATENT DOCUMENTS

| 59112 | 3/1913 | Germany | 137/404 |
|---|---|---|---|

*Primary Examiner*—George L. Walton
*Attorney, Agent, or Firm*—Pennie & Edmonds LLP

[57] ABSTRACT

A bubbler container assembly particularly adapted for use in vapor generating systems comprising a main outer vessel, an inner bubbler vessel, a carrier gas inlet and a vapor outlet such that the inner bubbler vessel is contained within the main outer vessel and the bubbler container assembly is constructed so as to self-meter an incoming supply of vaporizable liquid during the introduction of a carrier gas and extraction of resulting vapor. Preferably, the system further provides for magnetic induced centering and positioning of the inner buoyant bubbler vessel, fluid temperature sensing and control, connection of a fluid makeup supply, carrier gas inlet supply, and vapor extraction outlet.

8 Claims, 3 Drawing Sheets

SELF-METERING RESERVOIR

BACKGROUND OF THE INVENTION

1. Field of the Invention

The present invention relates generally to systems for maintaining a generally constant level of fluid within a vessel and more particularly to systems for supplying vapor to a chemical process by introducing a carrier gas into a fluid column of vaporizable liquid.

2. Background Information

A common technique used in vapor generating systems for delivering chemical vapor to a process chamber is to force a carrier gas bubble through a chemical fluid in a bubbler and then to deliver the resulting vapor from the bubbler to the process chamber. Traditional bubblers, including those utilized in presently available automatic refill systems, rely on relatively large fluid volumes to intrinsically compensate for deviations in fluid level which can negatively effect the resulting vapor concentration. Since vapor sources in the fiber optics and semiconductor industries are often hazardous fluids, there has been an increasing focus on the occupational safety and health concerns resulting from use of such fluids. This has resulted in reducing the maximum allowable volumes of many of these fluids within the work place. It is therefore desirable to reduce the required fluid volume at the point of vapor generation without compromising vapor concentration control.

Typically a bubbler container is comprised of a single vessel which holds an expendable volume of vaporizable fluid. A carrier gas such as hydrogen, helium or nitrogen is introduced at the lower level of a fluid column, travels up through, and exits the fluid surface into a head space. As the carrier gas passes through the fluid column it becomes entrained with vapor which results in a corresponding reduction of the fluid volume. This reduction of the fluid level in the bubbler container may be significant for several reasons. For example, the vaporization efficiency and overall vapor concentration uniformity are both affected by the fluid level and are both important elements which may affect the strict tolerance requirements of the process application. In addition, the physical fluid column in the bubbler not only determines the carrier gas contact time and resulting bubble geometry but also represents the mass to which thermal energy is either added or extracted. It also defines the head space present above and within the bubbler container which has been found to negatively effect the vapor concentration and ultimate bubbler performance when not optimized.

Inasmuch as vapor extraction from a fluid volume results in depleting the fluid volume of a bubbler, causing variations in vapor concentration, a means of replenishing this fluid is desirable. Some methods include manually replacing the bubbler ampule once the volume of fluid reaches a predetermined minimum acceptable level. Other manual methods rely on an auxiliary supply of fluid to replenish the bubbler during intermittent periods of non-use. Although such methods can result in reducing many of the concerns associated with prior art expendable bubblers, such as reducing the risk of contamination during ampule replacement or any necessary fluid replenishment, these systems typically remain idle until an interruption in vapor extraction provides a refill opportunity. With many of the advanced processes running for long periods of time before a refill opportunity is presented, the fluid level may descend considerably resulting in less than optimum vapor delivery efficiency. Although there are techniques which can be employed to compensate for the influences of a constantly descending fluid volume, such as intermittent refill in between process runs, such techniques can be complex and costly. In any event, such techniques do not satisfy the level of control achieved by the present invention.

In addition to manual replenishment of fluid, automatic bubbler refill systems are also available. However, such systems typically employ float coupled electronic devices, such as level controllers, to control the replenishment of fluid in the bubbler. Such devices are prone to failure and are generally the most common failure mechanism in the system. Other types of fluid level sensors such as optical, load cell monitoring of the contents, and resistance probes have been employed. However, the use of such devices can be costly, prone to error, and with many of the fluids being flammable, represent ignition sources if not properly rated and maintained.

SUMMARY OF THE INVENTION

Accordingly, one object of the present invention is to provide a cost efficient and reliable bubbler reservoir system capable of metering an external supply of fluid into itself to maintain a nearly constant liquid level while it bubbles vapor to a process.

Another object is to restrict an incoming supply of fluid to the bubbler to prevent overfill conditions without the need for electronic or optical level detection devices.

A further object of the invention is to provide a means of dramatically reducing the fluid volume at the point of vapor generation without compromising vapor concentration control.

Another object of the present invention is to prevent or reduce wear effects or particle generation from friction by the use of magnetic forces.

A further object of the invention is to provide an optimum mechanism for controlling the temperature of the inner bubbler fluid by directing makeup fluid along the outer walls of the inner bubbler vessel where thermal energy can be added or extracted, as required, prior to introducing this fluid into the inner vessel, thereby reducing potential for thermal cycling as makeup fluid mixes with inner bubbler fluid.

Another object of the invention is to provide a means of calibrating the buoyant interaction of the inner bubbler vessel relative to different fluid applications and more specifically to differences in specific gravity through the use of opposing magnetic fields, one fixed within the inner buoyant bubbler vessel and one which can be adjusted at the base of the outer vessel.

The above and other objects of the present invention are accomplished in a system that overcomes the disadvantages and limitations of the prior art by providing an apparatus and method to generate and support the delivery of vapor from a vaporizable source contained in a bubbler as described herein and to support the real-time metering of an incoming supply of makeup fluid to replace fluid lost as a result of the consumption of vapor. The system meters the introduction of the incoming fluid in direct response to the extraction of fluid being converted to and carried off as vapor. The invention's novel approach to minimizing the resident fluid volume required to support the continuous delivery of vapor is most notably due to its intrinsic control of makeup fluid in direct response to small changes in fluid within the bubbler. In a preferred form, the invention may also include one or more of the following: the use of adjustable magnetic fields to compensate for fluids of different specific gravities, the use of magnetic fields to reduce the possibility of particulate contamination otherwise resulting from surface abrasion at the contact points of moving parts within the bubbler, the use of thermoelectric converters to control the temperature of the bubbler fluid, a reduction in the overall bubbler size and temperature control type, and the ability to integrate the device much closer to the process site. The latter features not only reduce the final cost of the bubbler, and its integration into process equipment, but also further reduces the degrading influence of ambient temperature effects associated with longer vapor delivery lines running from a bubbler to the point of process.

The present invention is also particularly advantageous in applications where a plurality of bubblers are supported by a single bulk refill system. In a typical bulk refill system, a call for makeup fluid occurs when there is a discontinuation of a process due to the detection of a low liquid level in the bubbler. Due to the potential for multiple prior art bubblers to call for material at the same time, the bulk refill system must be adequately sized for the total volume consumption rate of the plurality of bubblers. With the present invention, there is no communication required between the process and the bulk refill system. Since a plurality of bubblers can be refilled in real time, there is also a substantially reduced demand on the bulk refill systems. Further, there is no discontinuation of process required; nor is there a requirement for venting the bubbler as it is refilled. Refill occurs at a volume flow rate equivalent to the extraction rate of vapor from the bubbler. This creates an optimum condition for the bulk distribution system in that fluid is only required at the rate of consumption at any one or more points actively delivering vapor. This feature is in contrast to manual vapor delivery systems in which fluids are replenished during periods of time when vapor is not being delivered from the bubbler. In prior art automatic refill systems, the supporting volume flow rate demand is a function of how often a makeup opportunity is presented and the volume of fluid necessary to refill any probable number of supported bubblers at any period in time. In both cases, the distribution system must be sized for the maximum volume makeup flow rate of the plurality of bubblers supported by the system. This method results in placing a volume flow rate demand on the refill system equal to the total volume of makeup fluid required by the plurality of bubblers. In contrast, the present invention calls for makeup fluid when it is actively delivering vapor, the maximum volume flow rate of the refill system is a function of the total flow rate consumption of liquid times the number of bubblers in an active vapor delivery state. Thus, there is a significant benefit on both the initial cost and safety of the bulk refill system because the sizing of the system components can be significantly reduced as well as the total volume of hazardous fluid within the delivery system.

DETAILED DESCRIPTION OF THE PREFERRED EMBODIMENTS

The following description is of the best presently contemplated modes of carrying out the invention. This description is not to be taken in a limiting sense but is made merely for the purpose of describing the principles of the invention.

Figure 1:
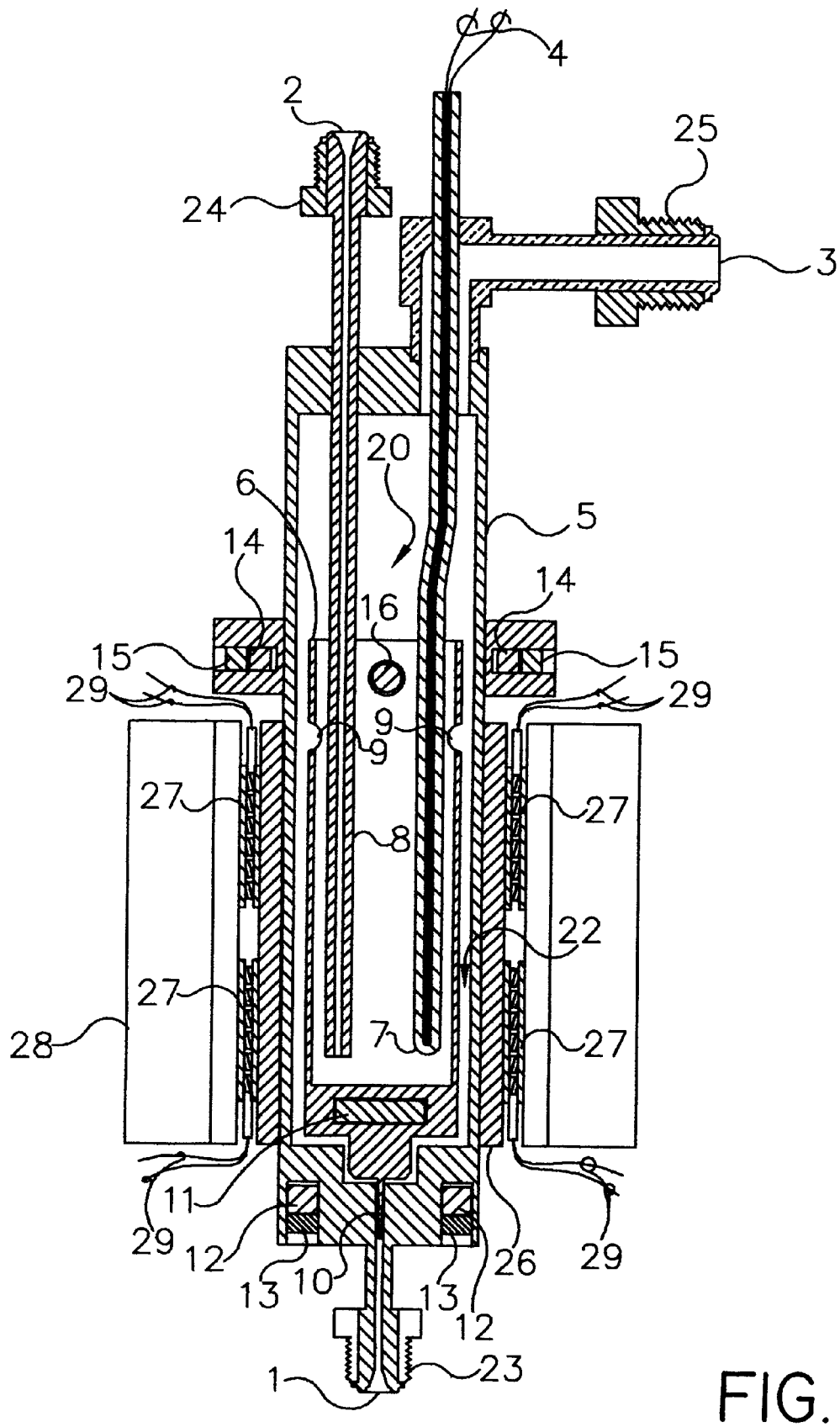
FIG. 1 is a front face cutaway illustration of a bubbler container assembly in accordance with the present invention.
Figure 2:
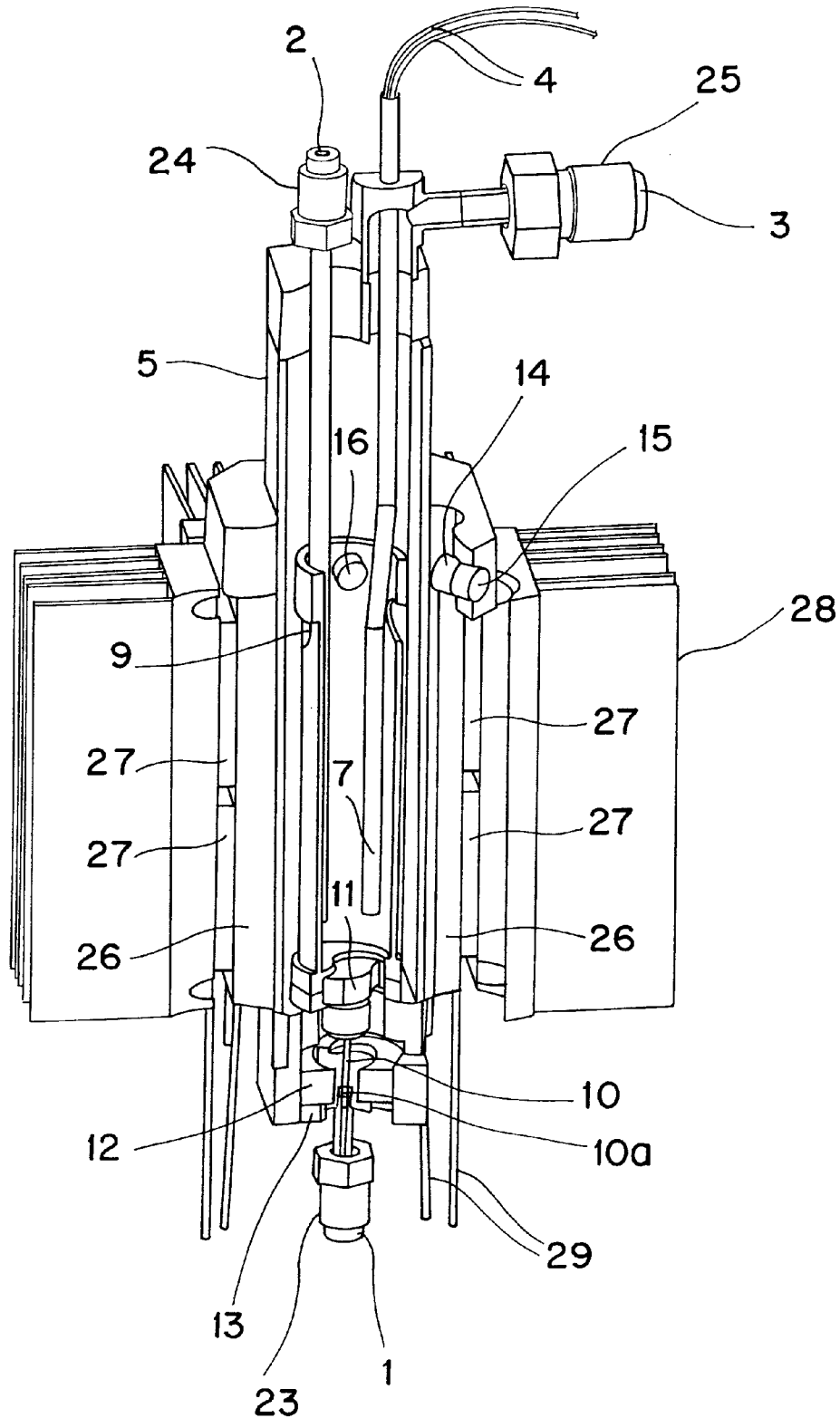
FIG. 2 is an isometric cutaway illustration of the bubbler container assembly.

The description herein presented refers to the accompanying drawings in which like reference numerals refer to like parts throughout the several views. FIG. 1 is an illustration depicting an assembly of elements comprising the bubbler. During operation, the bubbler assembly operates as a float coupled metering device which supports the generation of vapor from a vaporizable fluid contained within the float vessel. Among the major elements depicted in FIG. 1 are the primary containment vessel 5 and the inner bubbler float vessel 6. A carrier gas, supplied and controlled externally, connects to port 2 through fitting 24, travels through the conduit 8 and exits into the lower level of the vaporizable fluid present within the inner float vessel 6. As the carrier gas travels up through the fluid it becomes entrained with vapor, exits the fluid surface into the head space 20 and exits discharge port 3 through fitting 25. As a result of vapor generation, the fluid level of the inner float vessel 6 descends. This action results in reducing the weight of the inner float vessel 6 which is otherwise suspended within the fluid of the outer vessel 5. As a function of weight loss, the inner float vessel 6 gains buoyancy and ascends within the makeup fluid chamber 22 of the outer vessel 5. The upward buoyant movement of the inner vessel 6 withdraws metering stem tip 10 from aperture 10a which is shown in FIG. 2. This action meters a corresponding makeup fluid flow into the makeup fluid chamber 22 from an externally supplied source connected to port 1 and fitting 23. As the makeup fluid level rises within the makeup fluid chamber 22 of outer vessel 5, the inner float vessel 6 continues to travel upward. In the preferred embodiments shown in FIG. 1 and FIG. 2, the magnets 14 are encased by fittings 15 in each of the four corners of the upper portion of the outer vessel 5. The rising inner float vessel 6 is increasingly repelled by the flux fields of magnet 16 as it ascends into the flux fields of magnets 14. At a point when the repelling force exceeds the buoyant lift of the inner float vessel 6, makeup fluid in the outer vessel 5 reaches and cascades into the inner float vessel 6 through holes 9. The introduction of makeup fluid into the inner float vessel 6 increases its weight causing it and metering tip 10 to descend into aperture 10a restricting the makeup flow rate.

During operation, the extraction of fluid from the inner float vessel 6 by means of evaporation results in lowering the energy level of the fluid volume. This thermal energy loss is a function of the latent heat of vaporization for the fluid being evaporated and the extraction rate of fluid per unit time. The fluid temperature within the bubbler may be controlled and monitored by standard industrial thermoelectric temperature control modules 27, such as that sold by Melcor Corporation as part number CP1.0-127-051-2 and a thermal well 7 filled with oil and incorporating a temperature sensing thermocouple, such as that sold by Simpson as Type 21244, Sensor Type RTD. The thermoelectric temperature control module power leads 29 and temperature probe sensor leads 4 integrate by means of standard industrial practice to a programmable temperature controller 32, shown in FIG. 3. Aluminum plates 26 fastened to the exterior walls of the outer vessel 5 increase the thermal exchange rate between the thermoelectric converters 27 and the fluid volume in the outer vessel 5. Commercially available convection type heat transfer fins 28, such as those sold by Melcor Corporation, are placed on the outer faces of the thermoelectric converters 27 to increase the thermal exchange rate efficiency of the temperature control unit. These elements are incorporated so as to provide ampule thermal capacity as dictated by the amount of fluid to be evaporated per unit time and the fluid's latent heat of vaporization.

The dry weight of the inner vessel 6 is compensated for by the repelling forces of the opposing fields of the inner vessel disc magnet 11 and the outer vessel ring magnet 12. Because the invention is intended to be utilized with many different fluid types, compensating for fluid characteristics such as specific gravity and viscosity is accomplished by setting the distance between the outer vessel ring magnet 12 and the inner vessel disc magnet 11. This adjustment is accomplished by turning the outer vessel magnet backup ring 13 which is threaded into the base of the outer vessel 5. In function, an otherwise dry inner vessel 6 is dynamically suspended just above its fully seated position within the outer vessel metering aperture 10a. This results in reducing the metered influx of a makeup fluid entering the outer vessel to a point less than the lowest possible evaporation rate during the introduction of a carrier gas. Isolation valves incorporated within the supply stream of the fluid makeup, carrier gas inlet, and vapor delivery lines work as a group and are either open or closed as a group thereby totally isolating the invention when vapor is not needed.

Optimum functionality of the preferred embodiments are dependent upon the strength of the magnetic fields. For this reason, rare earth magnets such as the type sold by Master Magnetics, Inc. as Samarium Cobalt are preferred to satisfy the various shapes noted as magnets 11, 12, 14, and 16. Because the invention is intended to handle fluids that must be contamination free and specifically free of byproducts resulting from a reaction between the fluid and the magnetic material, magnets 11 and 16 should be fully encased in the same material as that of the inner and outer bubbler vessels.

Figure 3:
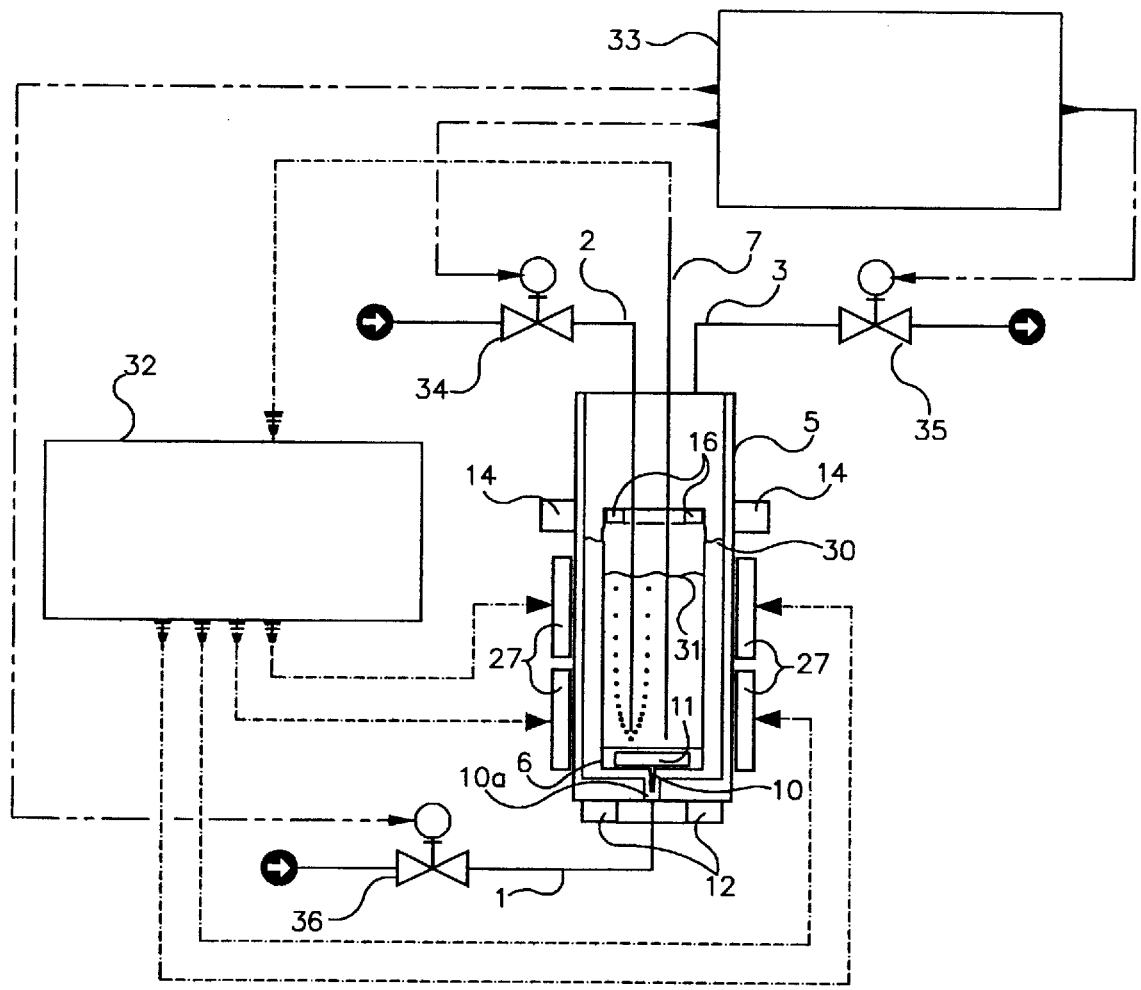
FIG. 3 is a diagrammatic illustration of a bubbler container assembly depicted within a basic operational control scheme for implementing the present invention.

FIG. 3 depicts a diagrammatic illustration of the vapor generation system. Representative are the reservoir fluid level 30, and inner bubbler vessel fluid level 31, as a carrier gas is introduced through conduit 2, exits into and travels up through the inner vessel bubbler fluid contained therein and is converted to a vapor state. This action reduces the amount of fluid contained within the inner bubbler vessel 6. The resulting loss of fluid within the inner bubbler vessel 6, as fluid is converted to vapor, reduces its total weight resulting in an increase in buoyancy; the total dry mass of the inner vessel 6 in conjunction with a preferred minimum volume of fluid therein result in a fully seated state with respect to the position of the metering stem tip 10 and the fluid makeup aperture 10a. Although absolute isolation of makeup fluid being introduced into the reservoir is not intended, in the fully seated state, the influx rate of makeup fluid is far below the lowest possible liquid to vapor conversion rate under any normal state of operation. To insure that the reservoir cannot become overfilled with fluid, independent isolation of the fluid makeup source through port 1 and the carrier gas source through port 2 is included. As seen in FIG. 3, representative industrial standard valves, such as that sold by Nupro-Swagelok, Co. as part number SS-BNV51-C are used for positive isolation of the inlet ports 1 and 2, and outlet port 3. In the preferred embodiments, all three valves, 34, 35, and 36, are of the normally closed automatic type. As represented in FIG. 3, control signals to each of the valves would originate from a control system 33. This control system would most likely be part of the overall process automation platform controlling all the devices necessary to support the vapor deposition application.

It should be understood that the embodiments described herein merely illustrate principles of the invention in selected preferred forms. Many modifications, additions and deletions may, of course, be made thereto without departure from the spirit and scope of the invention as set forth in the following claims.

What is claimed is:

1. A fluid handling apparatus comprising:

a primary containment vessel having a fluid inlet, said fluid inlet having a valve seat portion, a fluid control metering member adjacent the fluid inlet to control the amount of fluid entering the primary containment vessel, a float vessel disposed within the primary containment vessel, said float vessel having at least one opening for the passage of fluid between said primary containment vessel and said float vessel wherein said fluid is collected and at least a portion of the collected fluid is used for another purpose during normal operation of said fluid handling apparatus, said float vessel further operating as a self-metering vessel in that the weight of the remaining amount of fluid in the float vessel controls the metering member to generate a metered flow rate through the inlet while maintaining a generally constant level of fluid within the float vessel during normal operation of the apparatus.

2. A fluid handling apparatus comprising:

a primary containment vessel having a fluid inlet, said fluid inlet having a valve seat portion, a fluid control metering member adjacent the fluid inlet to control the amount of fluid entering the primary containment vessel, a float vessel disposed within the primary containment vessel, said float vessel having at least one opening for the passage of fluid between said primary containment vessel and said float vessel wherein said fluid is collected and at least a portion of the collected fluid is used for another purpose during normal operation of said fluid handling apparatus, said float vessel further operating as a self-metering vessel in that the weight of the remaining amount of fluid in the float vessel controls the metering member to generate a metered flow rate through the inlet while maintaining a generally constant level of fluid within the float vessel during normal operation of the apparatus, and a first magnet mounted to the float vessel and a second magnet mounted to the primary containment vessel, said first and second magnets being separated by a distance that may be adjusted to account for differing fluid characteristics that would affect the weight of the float vessel.

3. A fluid handling apparatus comprising:

a primary containment vessel having a fluid inlet, said fluid inlet having a valve seat portion, a fluid control metering member adjacent the fluid inlet to control the amount of fluid entering the primary containment vessel, a float vessel disposed within the primary containment vessel, said float vessel having at least one opening for the passage of fluid between said primary containment vessel and said float vessel wherein said fluid is collected and at least a portion of the collected fluid is used for another purpose during normal operation of said fluid handling apparatus, said float vessel further operating as a self-metering vessel in that the weight of the remaining amount of fluid in the float vessel controls the metering member to generate a metered flow rate through the inlet while maintaining a generally constant level of fluid within the float vessel during normal operation of the apparatus, and a temperature control mechanism, said temperature control mechanism being in thermal communication with said fluid to maintain the fluid at a selected temperature.

4. The apparatus according to claim 1 further comprising at least a pair of magnets, one magnet mounted on at least a portion of the primary containment vessel and another magnet mounted on at least a portion of said float vessel for maintaining alignment of the float vessel within the primary containment vessel.

5. A method for maintaining a generally constant level of fluid within an apparatus having an outer vessel, an inner vessel within said outer vessel and a metering member adjacent to a fluid inlet comprising the steps of:

(a) filling said outer vessel with fluid from a supply source through a fluid inlet having a valve seat portion, (b) filling said inner vessel with fluid from said outer vessel through at least one opening in the inner vessel, (c) controlling the flow rate of fluid into the outer vessel with said metering member as fluid enters the inner vessel, (d) performing an application which uses at lest a portion of the fluid from the inner vessel for another purpose during normal operation of said apparatus, (e) maintaining a generally constant level of fluid in the inner vessel by generating a metered flow rate through the inlet as a function of the remaining amount of fluid in the float vessel and thereby replenishing said inner vessel with fluid from the outer vessel becomes more buoyant, and (f) controlling the temperature of the fluid in the inner vessel to affect a desired fluid dynamic condition within the apparatus.

6. The method of claim 5 further comprising controlling the temperature of the fluid in a space between the inner vessel and the outer vessel.

7. A self-metering reservoir for maintaining a generally constant level of fluid in a vessel from which fluid is used comprising:

a primary containment vessel having a fluid inlet, said fluid inlet having a valve seat portion, a float vessel disposed within the primary containment vessel, said float vessel having at least one opening for the passage of fluid from said primary containment vessel into said float vessel wherein said fluid is collected and at least a portion of the collected fluid is used for another purpose during normal operation of said fluid handling apparatus, a fluid control metering member adjacent the fluid inlet which is responsive to the weight of the remaining fluid in the float vessel, said metering member constructed and positioned so as to generate a metered flow rate through the inlet during normal operation of the apparatus to allow a volume of fluid into the primary containment vessel corresponding to the volume of fluid used during operation of the apparatus to maintain a generally constant volume of fluid in the float vessel, and a temperature control device mounted to the primary containment vessel and in thermal communication with said fluid to control the temperature of the fluid in the float vessel.

8. A self-metering reservoir for maintaining a generally constant level of fluid in a vessel from which fluid is used comprising:

a primary containment vessel having a fluid inlet, said fluid inlet having a valve seat portion, a float vessel disposed within the primary containment vessel, said float vessel having at least one opening for the passage of fluid from said primary containment vessel into said float vessel wherein said fluid is collected and at least a portion of the collected fluid is used for another purpose during normal operation of said fluid handling apparatus, a fluid control metering member adjacent the fluid inlet which is responsive to the weight of the remaining fluid in the float vessel, said metering member constructed and positioned so as to generate a metered flow rate through the inlet during normal operation of the apparatus to allow a volume of fluid into the primary containment vessel corresponding to the volume of fluid used during operation of the apparatus to maintain a generally constant volume of fluid in the float vessel, and a fluid outlet above the surface of said fluid in the float vessel through which the used fluid from the float vessel exits.

* * * * *